US009418488B1

(12) United States Patent
Lambert

(10) Patent No.: US 9,418,488 B1
(45) Date of Patent: Aug. 16, 2016

(54) DRIVER PRODUCTIVITY SNAPSHOTS AND DYNAMIC CAPTURE OF DRIVER STATUS

(71) Applicant: Lytx, Inc., San Diego, CA (US)

(72) Inventor: Daniel Lambert, Carlsbad, CA (US)

(73) Assignee: Lytx, Inc., San Diego, CA (US)

( * ) Notice: Subject to any disclaimer, the term of this patent is extended or adjusted under 35 U.S.C. 154(b) by 1 day.

(21) Appl. No.: 14/523,744

(22) Filed: Oct. 24, 2014

(51) Int. Cl.

| | |
|---|---|
| ***G01M 17/00*** | (2006.01) |
| ***G06F 7/00*** | (2006.01) |
| ***G06F 19/00*** | (2011.01) |
| ***G07C 5/02*** | (2006.01) |
| ***G07C 5/00*** | (2006.01) |
| ***G07C 5/08*** | (2006.01) |

(52) U.S. Cl.
CPC *G07C 5/008* (2013.01); *G07C 5/02* (2013.01); *G07C 5/085* (2013.01); *G07C 5/0858* (2013.01)

(58) Field of Classification Search
CPC ....... G07C 5/085; G07C 5/008; G07C 5/0858
USPC ........................................................ 701/33.4
See application file for complete search history.

(56) References Cited

U.S. PATENT DOCUMENTS

| | | | | |
|---|---|---|---|---|
| 6,154,658 | A * | 11/2000 | Caci | H04M 11/04 455/466 |
| 8,140,358 | B1 * | 3/2012 | Ling | G06Q 40/08 340/439 |
| 9,047,721 | B1 * | 6/2015 | Botnen | G07C 5/008 |
| 2007/0135979 | A1 * | 6/2007 | Plante | G07C 5/008 701/33.4 |
| 2007/0257781 | A1 * | 11/2007 | Denson | G07C 5/008 340/425.5 |
| 2007/0257815 | A1 * | 11/2007 | Gunderson | G08G 1/16 340/903 |
| 2007/0260677 | A1 * | 11/2007 | DeMarco | H04N 21/4825 709/203 |
| 2007/0268158 | A1 * | 11/2007 | Gunderson | G06Q 40/08 340/933 |
| 2007/0271105 | A1 * | 11/2007 | Gunderson | G06Q 10/087 705/1.1 |
| 2008/0319604 | A1 * | 12/2008 | Follmer | G07C 5/0891 701/33.4 |
| 2010/0238009 | A1 * | 9/2010 | Cook | G06Q 10/10 340/439 |
| 2013/0197774 | A1 * | 8/2013 | Denson | G07C 5/008 701/99 |
| 2013/0274950 | A1 * | 10/2013 | Richardson | G08G 1/0112 701/1 |
| 2014/0195105 | A1 * | 7/2014 | Lambert | G07C 5/008 701/33.4 |
| 2014/0236382 | A1 * | 8/2014 | Richardson | G08G 1/0112 701/1 |
| 2014/0292504 | A1 * | 10/2014 | Cook | G06Q 10/10 340/439 |
| 2014/0309813 | A1 * | 10/2014 | Ricci | H04W 48/04 701/2 |

* cited by examiner

*Primary Examiner* — James Trammell
*Assistant Examiner* — Majdi Alsomiri
(74) *Attorney, Agent, or Firm* — Van Pelt, Yi & James LLP

(57) ABSTRACT

A system for determining productivity coaching information comprises an input interface and a processor. The input interface is configured to receive vehicle event recorder data. The processor is configured to determine a first state based at least in part on a first set of vehicle event recorder data, and determine a second state based at least in part on a second set of vehicle event recorder data. The second set of vehicle event recorder data is different from the first set of vehicle event recorder data. The processor is configured to determine whether the second state following the first state indicates a productivity characterization mode, and indicate to acquire a third set of vehicle event recorder data for a productivity coaching determination.

22 Claims, 10 Drawing Sheets

DRIVER PRODUCTIVITY SNAPSHOTS AND DYNAMIC CAPTURE OF DRIVER STATUS

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, global positioning system (GPS), etc., that report data, which is used to determine the occurrence of an anomalous event. Sensor data can be used to detect accidents, record accident details, etc. In addition, sensor data can be used to capture unproductive driver behavior (e.g., idling the vehicle, waiting before making a delivery, etc.).

BRIEF DESCRIPTION OF THE DRAWINGS

Various embodiments of the invention are disclosed in the following detailed description and the accompanying drawings.

DETAILED DESCRIPTION

Figure 1:
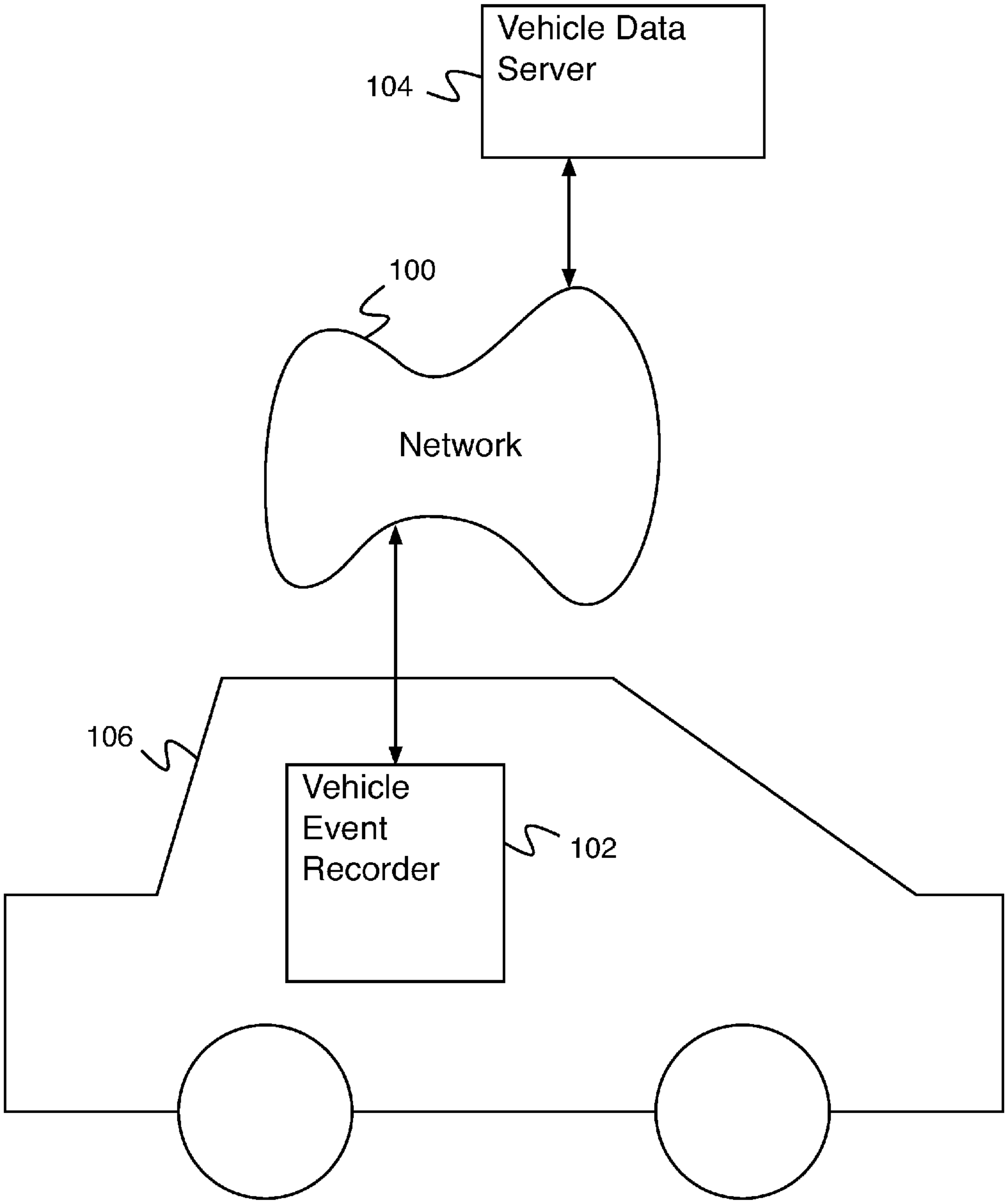
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining productivity coaching information is disclosed. A system for determining productivity coaching information comprises an input interface configured to receive vehicle event recorder data; and a processor configured to determine a first state based at least in part on a first set of vehicle event recorder data, determine a second state based at least in part on a second set of vehicle event recorder data, wherein the second set of vehicle event recorder data is different from the first set of vehicle event recorder data, determine whether the second state following the first state indicates a productivity characterization mode, and provide a third set of vehicle event recorder data for a productivity coaching determination.

In some embodiments, driver productivity snapshots and dynamic capture of driver status is disclosed. Data is automatically preferentially acquired and stored based on state or state transitions for productivity analysis. The state or state transition is determined from analysis of previous events or based on experience and, in various embodiments, is based on a driver, a vehicle type, a fleet, a customer, or any other appropriate factor. The automatic preferential acquisition and storage of data is triggered using a state or a state transition. This automated acquisition enables efficient use of storage space and transmission bandwidth as only relevant data is stored and later transferred for analysis. The automated acquisition based on state or state transition enables efficient capture of only relevant data automatically based on actual vehicle and driver activity. In some embodiments, the automatic determination to acquire data uses a productivity coaching determiner that determines whether to indicate to acquire a set of vehicle event recorder data for productivity coaching.

In some embodiments, a vehicle event recorder includes a memory and a processor (e.g., a hardware or computer processor) for storing and processing data, and a set of sensor inputs for receiving sensor data. Sensor data can be used to determine a current vehicle state of a set of vehicle states, and to follow a set of state transitions for the progression of an operation or a day. The vehicle event recorder thus has knowledge of the current state of the vehicle at all times. Driver productivity can be monitored using the vehicle event recorder sensor data, however, it is desirable to minimize the duration of time monitoring driver productivity. Collecting driver productivity data, transmitting the data to a home station, and evaluating the data can add up to a large expense, thus it is desirable to only monitor driver productivity when a state transition occurs indicating that it is likely to provide useful information. When it is desired to monitor driver productivity, the system enters a productivity characterization mode during states identified to most likely to show low productivity behavior.

In some embodiments, the productivity characterization leverages the existing system and infrastructure. Based on dynamic check-in, the available set of data is delivered as a summary of information in a manifest. Based on the backend algorithms, the data with the highest probability of value is transferred (e.g., if a company is focused on time/characterization of loading and unloading then these types of captures are targeted). On transfer of the data and snapshots, the images are human reviewed for the identified productivity markers. The driver's general log of state, productivity characterization logs and snapshot productivity behaviors markings are then analyzed by descriptive and predictive analytics algorithms to score the drivers based on productivity. This information is used to both compare driver performance and prioritize driver coaching opportunities.

FIG. 1 is a block diagram illustrating an embodiment of a system including a vehicle event recorder. In the example shown, vehicle event recorder 102 comprises a vehicle event recorder mounted in a vehicle (e.g., a car or truck). In some embodiments, vehicle event recorder 102 includes or is in communication with a set of sensors—for example, cameras, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, a driver identification camera, a door open sensor, an ignition on sensor, a power take-off sensor, a cargo door sensor, a rear activity camera, or any other appropriate vehicle state sensors. In various embodiments, vehicle event recorder 102 interfaces with vehicle sensors via an on-board diagnostics (OBD) bus (e.g., society of automotive engineers (SAE) J1939, J1708/J1587, On-Board Diagnostics (OBD)-II, controller area network (CAN) BUS, etc.), using an interface to a powertrain control module (e.g., a PCM), using FlexRay (e.g., a communication protocol), or using any other appropriate interface or protocol.

In some embodiments, vehicle event recorder 102 comprises a system for processing sensor data and detecting events. In some embodiments, vehicle event recorder 102 comprises a system for determining non-productive conditions. In some embodiments, vehicle event recorder 102 comprises a system for determining a state with a productivity snapshot with a high probability of value. In various embodiments, vehicle event recorder 102 comprises a system for detecting risky behavior, for detecting risky driving, for uploading anomalous driving events, for coaching a driver, or for any other appropriate purpose. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, universal mobile telecommunications system (UMTS), long term evolution (LTE), worldwide interoperability for microwave access (WiMax), integrated digital enhanced network (iDEN), or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and unproductive behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location.

Figure 2:
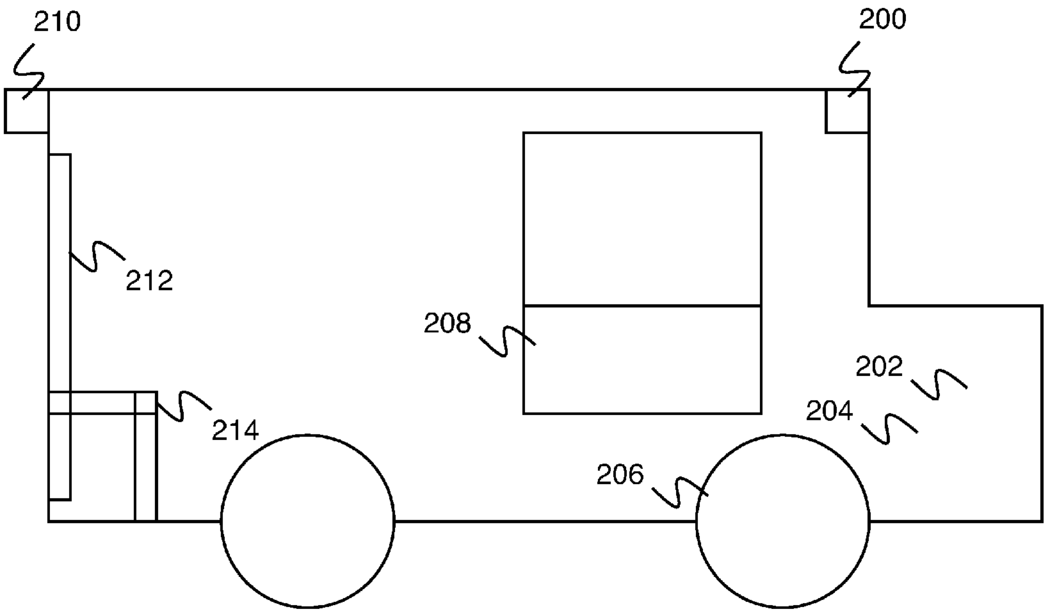
FIG. 2 is a diagram illustrating an embodiment of sensors mounted on a truck.

FIG. 2 is a diagram illustrating an embodiment of sensors mounted on a truck. In some embodiments, sensors indicated in FIG. 2 comprise vehicle state sensors. In some embodiments, sensor data from sensors indicated in FIG. 2 are used to determine a vehicle state. In the example shown, driver camera 200 comprises a camera for observing a driver. In some embodiments, driver camera 200 comprises a camera for determining if a driver is present. Ignition sensor 202 comprises a sensor for determining if the ignition is on (e.g., if the engine is running). Gear sensor 204 comprises a sensor for determining if the vehicle is in gear (e.g., ready to drive or in park). Speed sensor 206 comprises a sensor for determining vehicle speed. In some embodiments, speed sensor 206 comprises a sensor for determining if the vehicle is moving (e.g., vehicle wheel speed or GPS speed). Door sensor 208 comprises a sensor for determining if a door is open. In some embodiments, door sensor 208 comprises a sensor on a driver door. In some embodiments, more than one door sensor is present. Rear activity camera 210 comprises a camera for observing rear activity. In some embodiments, rear activity camera 210 comprises a sensor for determining if there is rear activity (e.g., loading or unloading from the rear of the truck). Rear door sensor 212 comprises a sensor for determining if the rear door is open. Utility power sensor 214 comprises a sensor for determining if a utility power is being used. In various embodiments, utility power of the utility power state is used for a lift gate, a boom lift, a jib crane, or any other appropriate powered vehicle accessory. In various embodiments, a utility power state comprises a state in which a power-take-off system associated with an engine is engaged, an engine is in an "idle up" state, an engine is in a "fast idle" state, or any other appropriate state.

Figure 3:
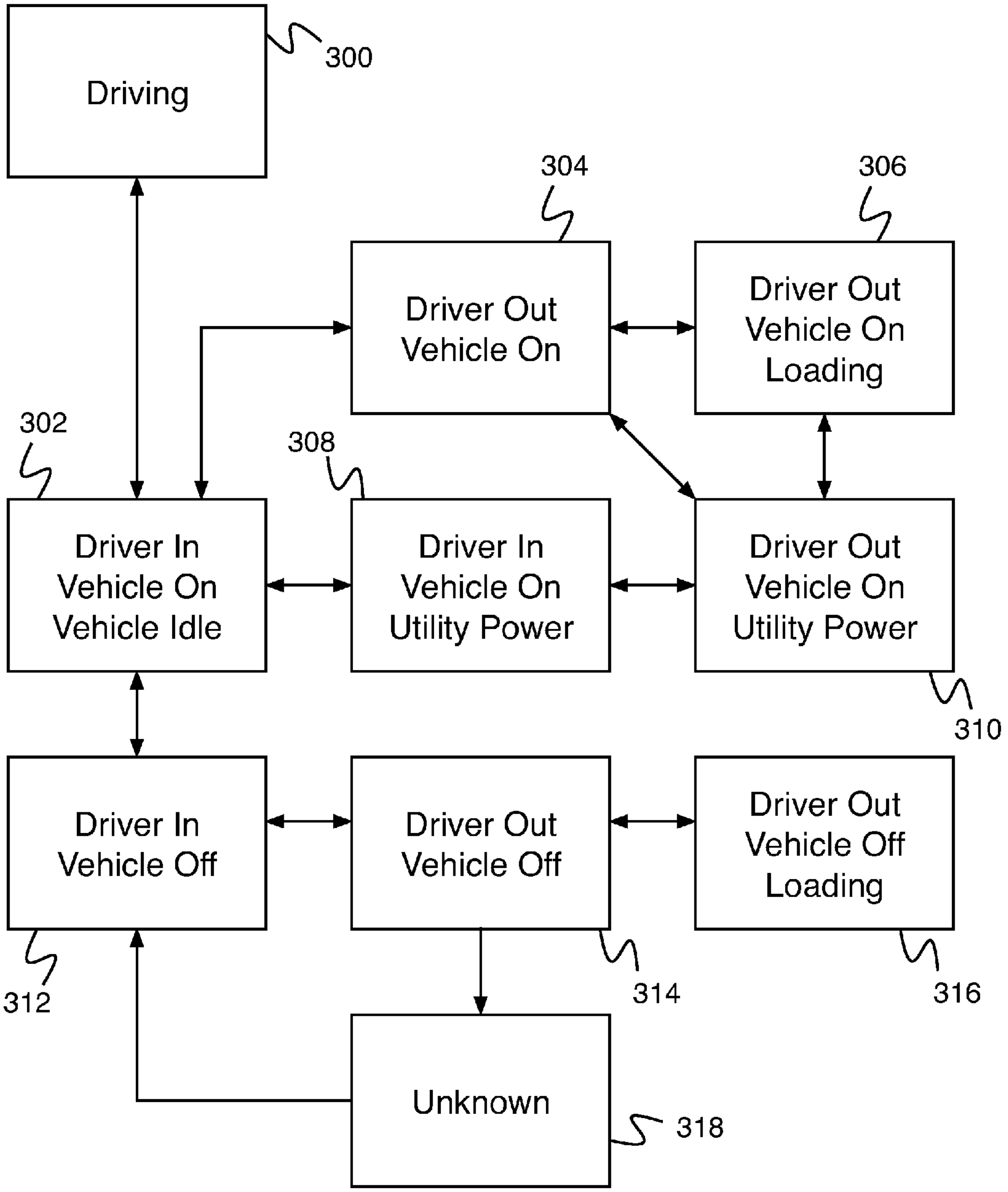
FIG. 3 is a state transition diagram illustrating a set of possible states and transitions for a vehicle.

FIG. 3 is a state transition diagram illustrating a set of possible states and transitions for a vehicle. In some embodiments, states of FIG. 3 are determined using sensor data from sensors of FIG. 2. In the example shown, driving state 300 comprises a state indicating the vehicle is being driven. In some embodiments, driving state 300 corresponds to sensor data indicating a driver is present, the vehicle ignition is on, the vehicle is in gear, and the vehicle has not been stationary for more than a stationary threshold.

Driver in; vehicle on; vehicle idle state 302 comprises a state indicating the vehicle is running but idle. In some embodiments, driver in; vehicle on; vehicle idle state 302 corresponds to sensor data indicating the driver is present and the vehicle ignition is on, but either the vehicle is not in gear or the vehicle has been stationary for more than the stationary threshold. Driver out; vehicle on state 304 comprises a state indicating the driver is not present in the vehicle but the vehicle is running. In some embodiments, driver out; vehicle on state 304 corresponds to sensor data indicating the driver is not present, the vehicle ignition is on, the rear cargo door is closed, and no rear activity is seen. In some embodiments, driver out; vehicle on state 304 indicates the driver has left the vehicle while it is running (e.g., to talk to a customer, on his way to load or unload cargo, etc.), but loading or unloading are not yet taking place.

Driver out; vehicle on; loading state 306 comprises a state indicating that the vehicle is running and the driver is out of the vehicle performing loading and/or unloading. In some embodiments, driver out; vehicle on; loading state 306 corresponds to sensor data indicating that the driver is not present, the vehicle ignition is on, and the rear cargo door is open and/or rear activity is seen. Driver in; vehicle on; utility power state 308 comprises a state indicating that the driver is in the vehicle, the vehicle is running, and the utility power is engaged (e.g., for running a lift gate, boom lift, jib crane, etc.). In some embodiments, driver in; vehicle on; utility power state 308 corresponds to sensor data indicating the driver is present in the vehicle, the vehicle ignition is on, and the utility power is engaged.

Driver out; vehicle on; utility power state 310 comprises a state indicating that the driver is out of the vehicle, the vehicle is running, and the utility power is engaged (e.g., for running a lift gate, boom lift, jib crane, etc.). In some embodiments, driver out; vehicle on; utility power state 310 corresponds to sensor data indicating the driver is not present in the vehicle, the vehicle ignition is on, and the utility power is engaged. In some embodiments, driver out; vehicle on; utility power state 310 comprises a state indicating that the driver is out of the vehicle performing loading and/or unloading (e.g., using the utility power).

Driver in; vehicle off state 312 comprises a state indicating the driver is present in the vehicle but the ignition is not running. In some embodiments, driver in; vehicle off state 312 corresponds to sensor data indicating the driver is present but the ignition is off. Driver out; vehicle off state 314 comprises a state indicating the driver is out of the vehicle and the vehicle is off. In some embodiments, driver out; vehicle off state 314 corresponds to sensor data indicating that the driver is not present in the vehicle, the ignition is not running, and the cargo door is closed and rear activity is not seen. In some embodiments, if the vehicle is in driver out; vehicle off state 314 for more than a threshold amount of time, it is determined that the vehicle is in unknown state 318.

Driver out; vehicle off; loading state 316 comprises a state indicating that the driver is not present in the vehicle and the ignition is off, and the driver is out of the vehicle performing loading and/or unloading. In some embodiments, driver out; vehicle off; loading state 316 corresponds to sensor data indicating that the driver is not present in the vehicle, the ignition is not running, and the cargo door is open and/or rear activity is seen. Unknown state 318 comprises a state indicating the vehicle is an unknown state. In some embodiments, unknown state 318 corresponds to sensor data indicating that the driver is not present in the vehicle, the ignition is not running, and the cargo door is closed and rear activity is not seen; and the state has not changed for more than a threshold period of time. In some embodiments, when a driver arrives at the vehicle (e.g., to begin a shift) the vehicle is found in unknown state 318. In some embodiments, when a driver enters the vehicle to begin driving, the vehicle transitions to driver in; vehicle off state 312.

Figure 4A:
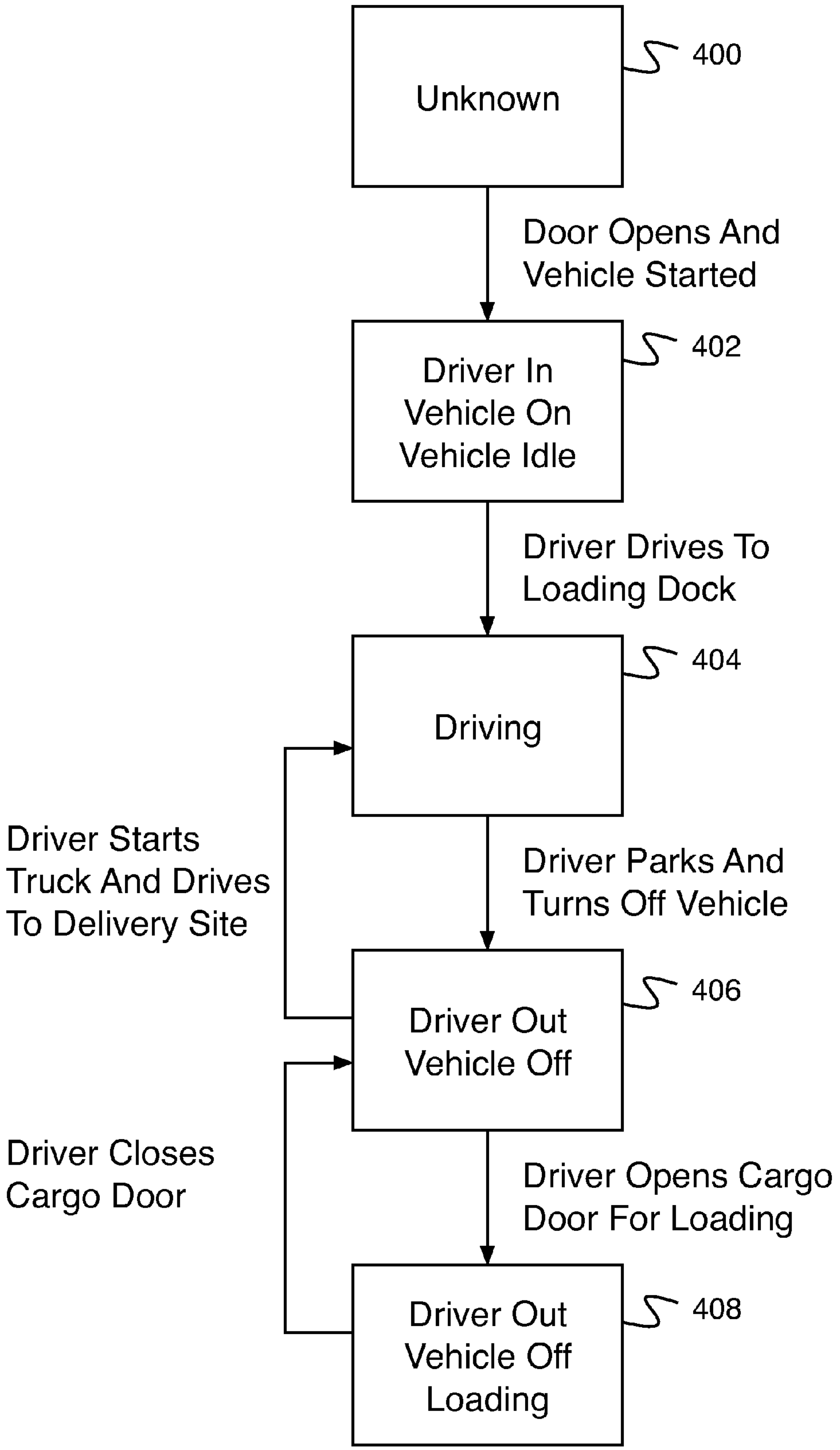
FIG. 4A is a state diagram illustrating an embodiment of a set of state transitions for a typical start of a day for a direct store delivery driver.

FIG. 4A is a state diagram illustrating an embodiment of a set of state transitions for a typical start of a day for a direct store delivery driver. In some embodiments, states as shown in FIG. 4A comprise states of FIG. 3. In the example shown, the direct store delivery use case comprises productivity monitoring of a driver's activity with respect to the tasks of picking up the day's load at the distribution center and delivering the load to the respective stores. For example, the use case comprises the delivery of beverages to a set route of convenience and grocery stores. To support the task of driver productivity optimization, the system characterizes the state of the driver during the pickup and delivery tasks to determine when productivity snapshots would have the highest probability of value. The productivity snapshots comprise periodic pictures from the available imagers for automatic marking and human review for behavioral characterization. In the example shown, a typical start of day is depicted for the case where the driver vehicle is stored at the same site as the distribution site where the load for delivery is picked up.

In the example shown, at the typical start of day, the event recorder is activated at the transition out of unknown state 400. Based on the transition to driver in; vehicle on; vehicle idle state 402 (e.g., via a driver in; vehicle on state), the event recorder enters into the productivity characterization mode. In this mode, the driver state, idle time, start/stop time of state, latitude/longitude associated with state and snapshots are taken and stored. In some embodiments, any transition to a driver in; vehicle on; vehicle idle state comprises a transition indicating a productivity characterization mode. The snapshots are from the event recorder interior/exterior camera and they are captured on a periodic basis optimized to characterize the driver activity (e.g., once snapshot every 2 minutes). During this interval, typical behaviors to capture are the driver doing paperwork in the air conditioning or heating, driver eating, drinking, etc. When the driver puts the vehicle into gear and drives to the loading dock, the state transitions to driving state 404, and the event recorder exits the productivity characterization mode. This comprises completing and saving the log file and stopping the periodic image capture. On parking, turning off the vehicle, and the driver exiting, the state changes to driver out; vehicle off state 406 (e.g., via a driver out; vehicle off state). A return to driving state 404 occurs in the event that the driver starts truck and drives to delivery site.

In the event that the driver opens the cargo door causing the state to transition to driver out; vehicle off; loading state 408, and the event recorder re-enters the productivity characterization mode where the driver state, duration of state, start/stop time of state, and latitude/longitude associated with state and snapshots are taken and logged. Typical behavior characterizations are the loading behavior (e.g., following corporate procedures such as lifting regulations, following pallet jack operation produces) and working at an efficient pace. For the driver out; vehicle off; loading state 408, the snapshots optimally include the backup camera to maximize visibility into the loading activity. On closing the cargo door, the snapshot mode is stopped and the snapshots are saved. Additionally, the log is completed and saved. At this point, the driver characterization is typically not re-entered for the typical start of day. Exceptions are cases such as the driver entering into a state of driver in; vehicle off or driver in; vehicle idle for greater than the configured allotted time interval.

Figure 4B:
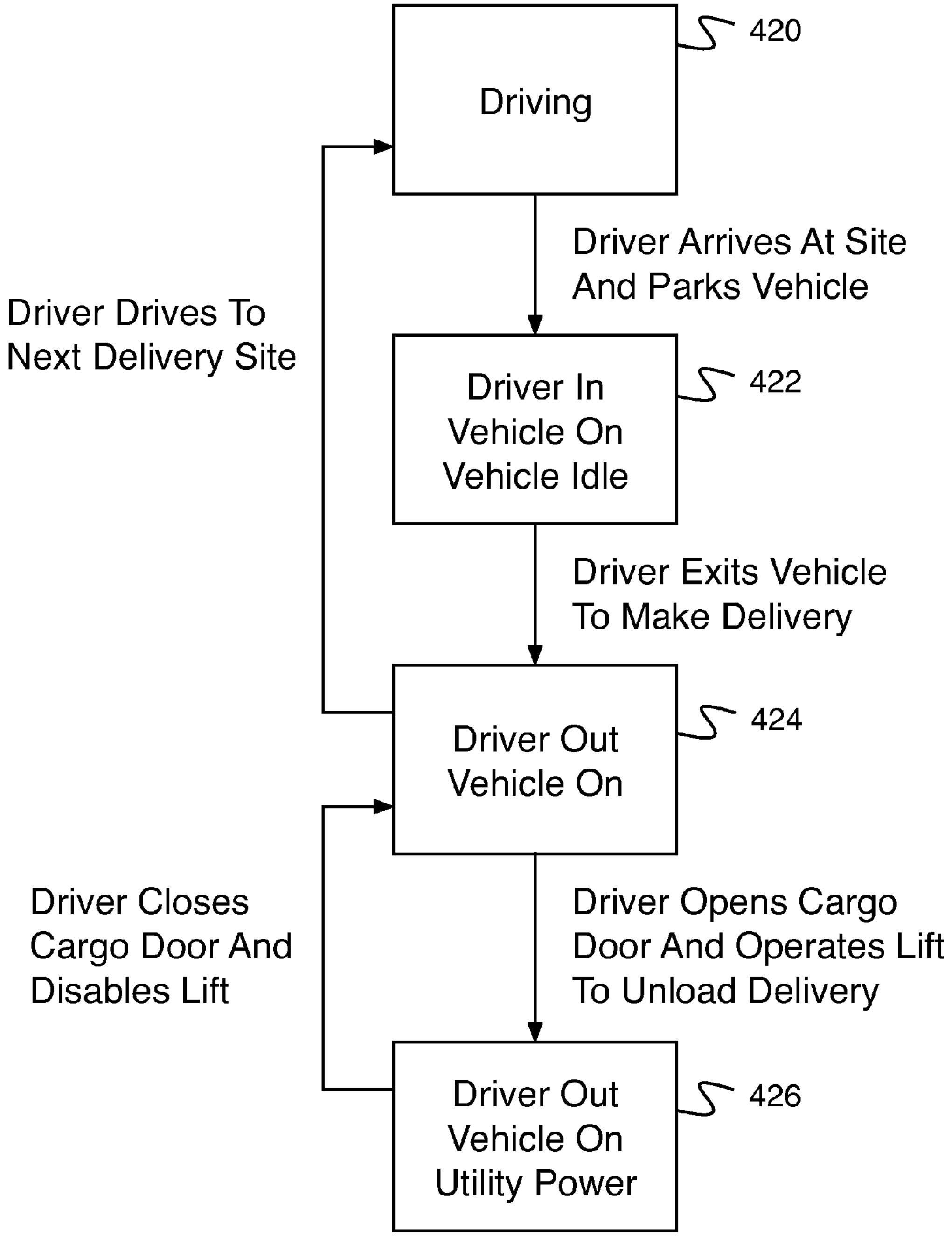
FIG. 4B is a state diagram illustrating an embodiment of a set of state transitions for a typical delivery for a direct store delivery driver.

FIG. 4B is a state diagram illustrating an embodiment of a set of state transitions for a typical delivery for a direct store delivery driver. In some embodiments, states as shown in FIG. 4B comprise states of FIG. 3. In some embodiments, the state diagram of FIG. 4B illustrates state transitions for a delivery where a lift gate is used. In the example shown, the state comprises driving state 420 as the vehicle approaches a location for a delivery. When the driver arrives at the site and parks, the state transitions to driver in; vehicle on; vehicle idle state 422 (e.g., the vehicle is left on in order to power the lift gate). The time in driver in; vehicle on; vehicle idle state 422 is monitored. The time in driver in; vehicle on; vehicle idle state 422 exceeding a configured threshold comprises a driver state transition of interest for productivity characterization.

In some embodiments, on entry to the productivity characterization mode, data is logged for the duration of the time in the state. In various embodiments, logged data comprises driver state, date/time of start of state, date/time of end of state, latitude/longitude of state (during non-driving states latitude/longitude should not change), time & file name of snapshots, and any other appropriate logged data. In some embodiments, still images are recorded as configured (e.g., at a periodic interval definable at the driver state level but typically every 120 seconds for general driver characterization). In some embodiments, when the vehicle enters productivity characterization mode in driver in; vehicle on; vehicle idle state 422, still images are recorded of the vehicle interior and exterior. The driver exits the vehicle in order to make the delivery and the state transitions to driver out; vehicle on state 424. In the event that the driver drives to the next delivery site, the state transitions from driver out; vehicle on state 424 to driving state 420. In some embodiments, the transition to driver out; vehicle on state 424 comprises a transition of interest for productivity characterization. When the driver opens the cargo door and operates the lift to unload the delivery, the state transitions to driver out; vehicle on; utility power state 426. Delivery is performed by the driver. In some embodiments, the transition to driver out; vehicle on; utility power state 426 comprises a transition of interest for productivity characterization. In some embodiments, when the vehicle enters productivity characterization mode in driver out; vehicle on; utility power state 426, still images are recorded of the vehicle rear. When the delivery is complete, the driver closes the cargo door and disables the lift, and the state transitions to driver out, vehicle on state 424. In various embodiments, entering productivity characterization mode attempts to capture inappropriate and or unproductive unloading physical behavior (e.g., not following corporate procedures on lifting regulations, not following corporate procedures on lift gate use, not following corporate procedures on pallet jack operation, etc.), and inefficient operation (e.g., working at an efficient pace, inappropriate interaction with store management, etc.), or any other appropriate behaviors for capture. In the event the driver closes cargo door and disables lift, the state transitions from driver out; vehicle on; utility power state 426 to driver out; vehicle on state 424.

Figure 4C:
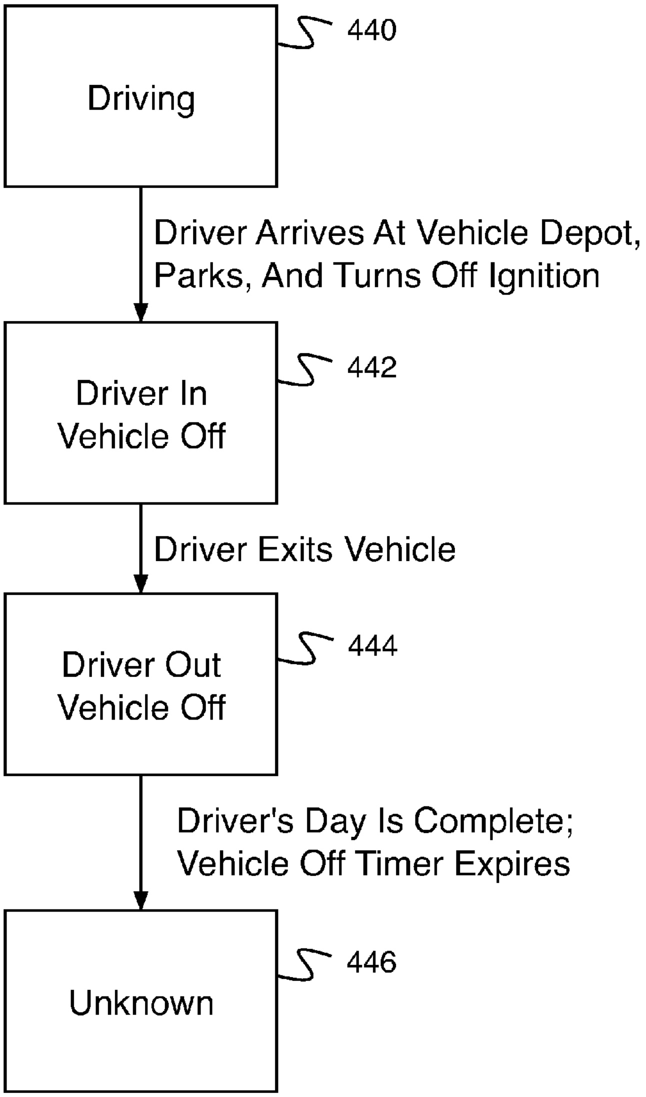
FIG. 4C is a state diagram illustrating an embodiment of a set of state transitions for an end of day procedure for a direct store delivery driver.

FIG. 4C is a state diagram illustrating an embodiment of a set of state transitions for an end of day procedure for a direct store delivery driver. In some embodiments, states as shown in FIG. 4C comprise states of FIG. 3. In the example shown, the state comprises driving state 440 as the vehicle approaches a vehicle depot. When the driver arrives at the vehicle depot, parks, and turns off the vehicle ignition, the state transitions to driver in; vehicle off state 442. In the event that the driver exits the vehicle, the state transitions to driver out; vehicle off state 444. This marks the end of the day for the driver, and once the vehicle off timer expires, the state transitions to unknown state 446. In the example shown for the typical end of day procedure, there are no targeted productivity behaviors. If the typical procedures are not followed, then a productivity characterization mode may be entered (e.g., if the driver is completing paperwork at the end of the day while idling).

In some embodiments, the system logs the duration a driver spends in each state for all the day's activities. This allows for a general characterization of the drivers activity to be assessed against company guidelines. In some embodiments company guidelines are company or industry specific. For example, the waste industry wants to minimize the time spent at a waste pickup while maintaining high standard of quality and safety while direct store delivery services have a customer interaction component and may require the driver to spend an appropriate interval of time interacting with the store management.

Figure 5:
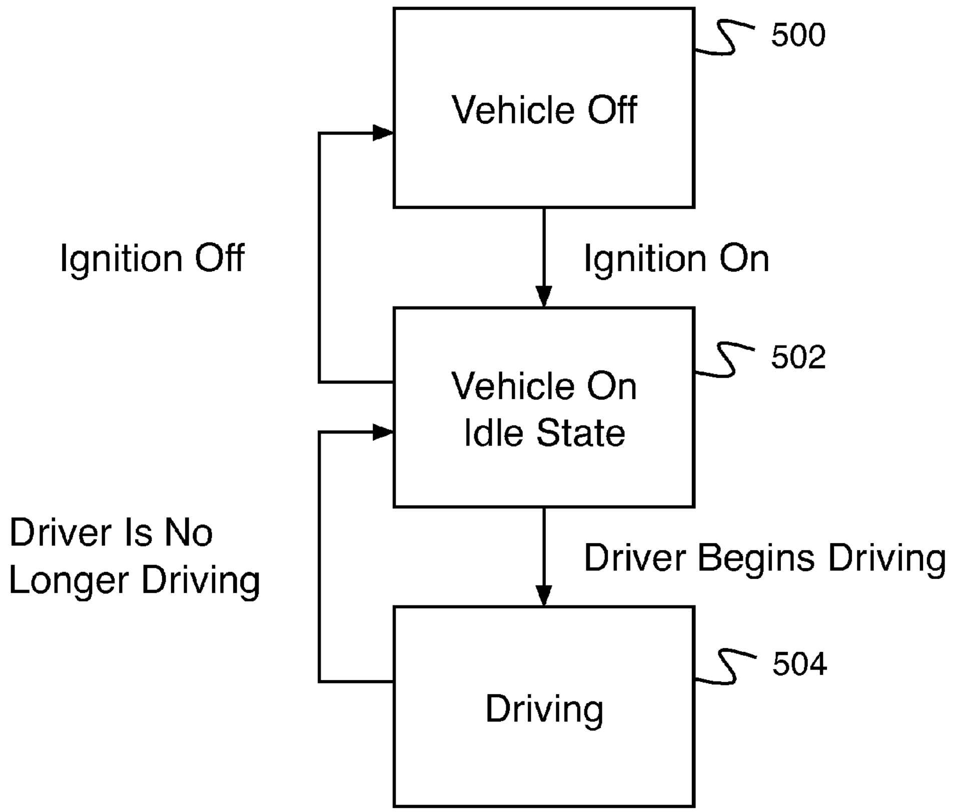
FIG. 5 is a state diagram illustrating an embodiment of a set of state transitions comprising a general idle state.

FIG. 5 is a state diagram illustrating an embodiment of a set of state transitions comprising a general idle state. In some embodiments, the general idle characterization is applicable to all markets and vehicle types that are interested in behavior change regarding vehicle idling. For this use case, the driver state of interest for characterization enhanced with snapshots is driver states that correspond to idling. For example, the system indicates interest in the idling state and because of the indicated interest, snapshots, video, or audio are taken and stored for coaching purposes. In the example shown, the state starts in vehicle off state 500. Once the driver has turned on the ignition, the state transitions to vehicle on; idle state 502. In various embodiments, vehicle on; idle state 502 comprises a driver in; vehicle on; vehicle idle state (e.g., driver in; vehicle on; vehicle idle state 302 of FIG. 3), a driver out; vehicle on state (e.g., driver out; vehicle on state 304 of FIG. 3), a driver out; vehicle on; loading state (e.g., driver out; vehicle on; loading state 306 of FIG. 3), a driver in; vehicle on; utility power state (e.g., driver in; vehicle on; utility power state 308 of FIG. 3); a driver out; vehicle on; utility power state (e.g., driver out; vehicle on; utility power state 310 of FIG. 3), or any other appropriate vehicle on; idle state. In some embodiments, the vehicle on; idle state 502 comprises a productivity characterization state. In the event that the driver begins driving, the state transitions to driving state 504. In the event that the driver is no longer driving, the state transitions to vehicle on; idle state 502. In the event that the ignition is turned off and the state comprises vehicle on; idle state 502, the state transitions to vehicle off state 500.

In some embodiments, for the duration of the time the state comprises vehicle on; idle state 502, required data (e.g., driver state, date and time of state entry, date and time of state exit, latitude and longitude when in state, time of snapshots, file name of snapshots, etc.) is logged. In some embodiments, snapshots (e.g., still images from cameras) are recorded. In some embodiments, snapshots are recorded at a periodic interval definable at the driver state level—typically every 120 seconds. In some embodiments, snapshots are recorded from cameras definable based on the driver state (e.g., when the state comprises a driver in; vehicle on; vehicle idle state, record from interior and exterior cameras, when the state comprises a driver out, vehicle on, utility power state, record from all cameras available, etc.). In some embodiments, the productivity characterization state attempts to capture information describing wasteful idle states (e.g., doing paperwork in the vehicle cab climate control, personal phone use in a vehicle, work phone use in the vehicle at the vehicle depot parking lot, sitting in the vehicle listening to music, etc.), and/or positive or necessary idle states (e.g., performing work tasks using the utility power, stuck in a traffic jam, in a queue for a loading dock, etc.).

In some embodiments, the vehicle on idle state productivity characterization is useful for determining a root cause of an idling violation, in order to properly evaluate a driver. For example, a driver was seen to regularly idle at a specific location before performing a delivery. This behavior typically would have triggered a warning, but an observation of the driver (e.g., in person, video observation, snap shot observation, etc.) learned that the driver was waiting in a loading dock queue and properly following company policy.

In some embodiments, storing images associated with inappropriate behavior (e.g., idling violations) allows increased accuracy of driver characterization and human interpretation to inspire behavioral change (e.g., teaching) opportunities. Not storing images associated with appropriate behavior (e.g., storing data for situations that are not actual violations—for example, false detection of a violation) allows increased productivity of interpretation of data review and reduction of storage required as well as reduced transmission cost (if this is applicable—for example, transmission of data across a cellular network) for data uploaded from event recorder to review server.

Figure 6:
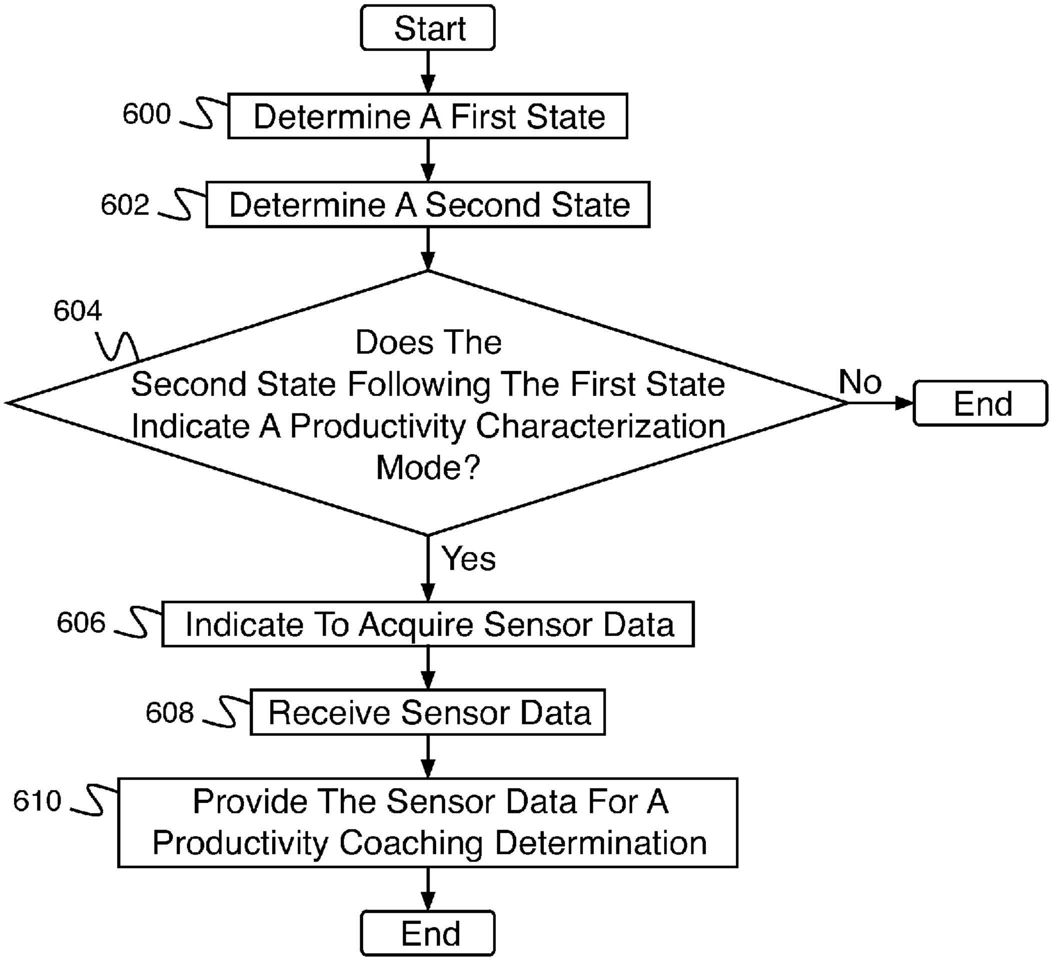
FIG. 6 is a flow diagram illustrating an embodiment of a process for providing coaching information.

FIG. 6 is a flow diagram illustrating an embodiment of a process for providing coaching information. In some embodiments, the process of FIG. 6 is executed by a vehicle event recorder (e.g., vehicle event recorder 102 of FIG. 1). In the example shown, in 600, a first state is determined. In some embodiments, the first state is determined based at least in part on a first set of vehicle event recorder data. In 602, a second state is determined. In some embodiments, the second state is determined based at least in part on a second set of vehicle event recorder data. In some embodiments, the second set of vehicle event recorder data comprises a set of vehicle event recorder data following the first set of vehicle event recorder data. In 604, it is determined whether the second state following the first state indicates a productivity characterization mode (e.g., a mode where driver productivity should be characterized). In the event that it is determined that the second state following the first state does not comprise a productivity characterization mode, the process ends. In the event that it is determined that the second state following the first state comprises a productivity characterization mode, control passes to 606. In 606, it is indicated to acquire sensor data. For example, an indication is provided to acquire sensor data (e.g., acquire a series of snapshots, a video, an audio recording, etc.). In 608, sensor data is received. For example, the sensor data acquired is received and stored (e.g., in a memory, in a memory of an event recorder, etc.). In some embodiments, sensor data comprises a third set of vehicle event recorder data. In 610, the sensor data is provided for a productivity coaching determination. In some embodiments, the sensor data is provided to a vehicle data server for a productivity coaching determination. In some embodiments, the sensor data is provided to a human reviewer for a productivity coaching determination.

In some embodiments, the first state and the second state are received (e.g., from a server) and stored by the event recorder. For example, a server provides an event recorder with the first and second state that are used to determine a productivity characterization mode (e.g., a mode where more information is to be acquired for potential training/coaching purposes). The first and second state trigger acquisition of potentially useful sensor data. In various embodiments, the first and second state provided to an event recorder depend on the driver of the vehicle associated with the event recorder, the fleet associated the vehicle associated with the event recorder, the customer associated with the vehicle associated with the event recorder, or any other appropriate grouping.

Figure 7:
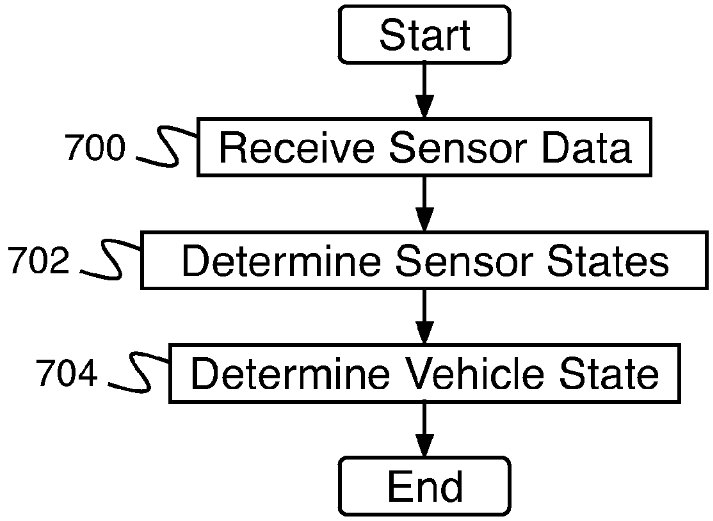
FIG. 7 is a flow diagram illustrating an embodiment of a process for determining a state.

FIG. 7 is a flow diagram illustrating an embodiment of a process for determining a state. In some embodiments, the process of FIG. 7 implements 600 of FIG. 6. In some embodiments, the process of FIG. 7 implements 602 of FIG. 6. In the example shown, in 700, sensor data is received. In various embodiments, sensor data comprises driver camera data, ignition sensor data, gear sensor data, speed sensor data, door sensor data, rear activity camera data, rear door sensor data, utility power sensor data, or any other appropriate sensor data. In some embodiments, sensor data comprises time data. In 702, sensor states are determined. In some embodiments, determining sensor states comprises determining states from sensor data received in 700 (e.g., determining driver in or out based on driver camera data, determining vehicle moving or not based on speed sensor data, etc.). In some embodiments, determining sensor states comprises determining whether more than a threshold amount of time has passed since sensor states have changed. In 704 a vehicle state is determined. In some embodiments, a vehicle state is determined from sensor states determined in 702.

Figure 8:
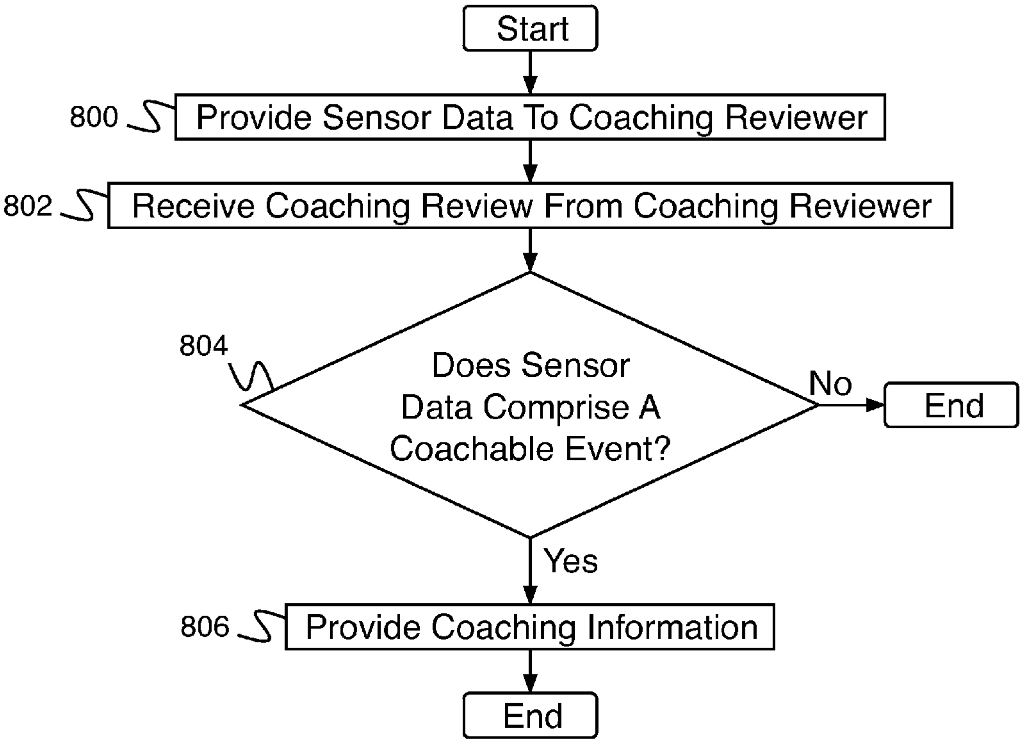
FIG. 8 is a flow diagram illustrating an embodiment of a process for a productivity coaching determination.

FIG. 8 is a flow diagram illustrating an embodiment of a process for a productivity coaching determination. In some embodiments, the process of FIG. 8 comprises a process for a productivity coaching determination based on sensor data received in the process of FIG. 6. In the example shown, in 800, sensor data is provided to a coaching reviewer. In various embodiments, sensor data is provided to the coaching review via a reviewing station, a reviewing app, etc. In 802, a coaching review is received from the coaching reviewer. In 804 it is determined whether the sensor data comprises a coachable event. In some embodiments, a coaching review received from a coaching reviewer indicates whether sensor data comprises a coachable event. In the event the sensor data does not comprise a coachable event, the process ends. In the event the sensor data comprises a coachable event, control passes to 806. In 806, coaching information is provided (e.g., to a driver). In various embodiments, coaching information is provided via a vehicle event recorder, via an app on a smartphone, as a paper memo, verbally from a supervisor, or in any other appropriate way.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining productivity coaching information, comprising:

an input interface configured to receive vehicle event recorder data;

a processor configured to:

determine a first state based at least in part on a first set of vehicle event recorder data;

determine a second state based at least in part on a second set of vehicle event recorder data;

determine whether a state transition from the first state to the second state indicates a beginning of or an end to a productivity characterization mode;

responsive to the determination of a beginning of the productivity characterization mode, automatically begin acquiring a third set of vehicle event recorder data, wherein at least some of the third set of vehicle event recorder data indicates a productivity level of a driver; and when the productivity characterization mode ends, then automatically terminate acquiring the third set of vehicle event recorder data;

wherein at least some of the first, second, and third sets of vehicle event recorder data is sensor-generated by a vehicle event recorder remote from the processor.

2. The system of claim 1, wherein the processor is further configured to receive the third set of vehicle event recorder data from a server.

3. The system of claim 1, wherein the third set of vehicle event recorder data comprises image data.

4. The system of claim 1, wherein the third set of vehicle event recorder data comprises video data.

5. The system of claim 1, wherein the third set of vehicle event recorder data comprises audio data.

6. The system of claim 1, wherein the third set of vehicle event recorder data comprises vehicle front data.

7. The system of claim 1, wherein the third set of vehicle event recorder data comprises vehicle rear data.

8. The system of claim 1, wherein the third set of vehicle event recorder data comprises vehicle inside data.

9. The system of claim 1, wherein the first set of vehicle event recorder data comprises inside camera data.

10. The system of claim 1, wherein the first set of vehicle event recorder data comprises ignition data.

11. The system of claim 1, wherein the first set of vehicle event recorder data comprises gear data.

12. The system of claim 1, wherein the first set of vehicle event recorder data comprises speed data.

13. The system of claim 1, wherein the first set of vehicle event recorder data comprises door data.

14. The system of claim 1, wherein the first set of vehicle event recorder data comprises rear camera data.

15. The system of claim 1, wherein the first set of vehicle event recorder data comprises rear door data.

16. The system of claim 1, wherein the first set of vehicle event recorder data comprises utility power data.

17. The system of claim 1, wherein the processor is further configured to receive the first set of vehicle event recorder data.

18. A method for determining productivity coaching information, comprising:

determining, using a processor, a first state based at least in part on a first set of vehicle event recorder data;

determining, using the processor, a second state based at least in part on a second set of vehicle event recorder data;

determining, using the processor, whether a state transition from the first state to the second state indicates a beginning of or an end to a productivity characterization mode;

responsive to the determination of a beginning of the productivity characterization mode, automatically begin acquiring, using the processor, a third set of vehicle event recorder data, wherein at least some of the third set of vehicle event recorder data indicates a productivity level of a driver; and when the productivity characterization mode ends, then automatically terminate acquiring the third set of vehicle event recorder data;

wherein at least some of the first, second, and third sets of vehicle event recorder data is sensor-generated by a vehicle event recorder remote from the processor.

19. The method of claim 18, further comprising making a productivity coaching determination, including scoring a driver based on productivity, the scoring being based on the third set of vehicle event recorder data.

20. The method of claim 19, wherein the scoring is based on a level of driver activity indicated by the third set of vehicle event recorder data.

21. The method of claim 18, wherein the determination of the state transition is based on a likelihood of a driver performing at a pre-defined level of productivity during the second state.

22. A computer program product for determining productivity coaching information, the computer program product being embodied in a non-transitory computer readable storage medium and comprising computer instructions for:

determining, using a processor, a first state based at least in part on a first set of vehicle event recorder data;

determining, using the processor, a second state based at least in part on a second set of vehicle event recorder data;

determining, using the processor, whether a state transition from the first state to the second state indicates a beginning of or an end to a productivity characterization mode;

responsive to the determination of a beginning of a productivity characterization mode, automatically begin acquiring, using the processor, a third set of vehicle event recorder data, wherein the third set of vehicle event recorder data indicates a productivity level of a driver; and when the productivity characterization mode ends, then automatically terminate acquiring the third set of vehicle event recorder data;

wherein at least some of the first, second, and third sets of vehicle event recorder data is sensor-generated by a vehicle event recorder remote from the processor.

* * * * *